(12) United States Patent
Karnik

(10) Patent No.: US 7,760,487 B2
(45) Date of Patent: Jul. 20, 2010

(54) DOPED CERAMIC POWDER FOR USE IN FORMING CAPACITOR ANODES

(75) Inventor: Tomas Karnik, Lanskroun (CZ)

(73) Assignee: AVX Corporation, Myrtle Beach, SC (US)

( * ) Notice: Subject to any disclaimer, the term of this patent is extended or adjusted under 35 U.S.C. 154(b) by 217 days.

(21) Appl. No.: 11/875,993

(22) Filed: Oct. 22, 2007

(65) Prior Publication Data

US 2009/0103247 A1    Apr. 23, 2009

(51) Int. Cl.
  *H01G 9/04*  (2006.01)
  *H01G 9/145* (2006.01)
(52) U.S. Cl. ............................. 361/528; 361/529
(58) Field of Classification Search .......... 361/528–529
  See application file for complete search history.

(56) References Cited

U.S. PATENT DOCUMENTS

| | | | |
|---|---|---|---|
| 3,345,545 A | 10/1967 | Bourgault et al. |
| 4,084,965 A | 4/1978 | Fry |
| 4,085,435 A | 4/1978 | Galvagni |
| 4,118,727 A | 10/1978 | Laplante |
| 4,131,520 A | 12/1978 | Bernard et al. |
| 4,149,876 A | 4/1979 | Rerat |
| 4,155,017 A | 5/1979 | Gaule et al. |
| 4,278,513 A | 7/1981 | Millard et al. |
| 4,412,902 A | 11/1983 | Michikami et al. |
| 4,672,267 A | 6/1987 | Lapatovich et al. |
| 4,712,857 A | 12/1987 | Lee |
| 4,722,756 A | 2/1988 | Hard |
| 4,892,862 A | 1/1990 | Ogushi et al. |
| 4,945,452 A | 7/1990 | Sturmer et al. |
| 4,957,541 A | 9/1990 | Tripp et al. |
| 5,098,485 A | 3/1992 | Evans |
| 5,198,187 A | 3/1993 | Lu et al. |
| 5,198,968 A | 3/1993 | Galvagni |
| 5,306,479 A | 4/1994 | Sommers |
| 5,357,399 A | 10/1994 | Salisbury |
| 5,394,295 A | 2/1995 | Galvagni et al. |
| 5,457,862 A | 10/1995 | Sakata et al. |

(Continued)

FOREIGN PATENT DOCUMENTS

CN    1549286    11/2004

(Continued)

OTHER PUBLICATIONS

UK Search Report for GB0814675.5 dated Dec. 12, 2008, 4 pages.

(Continued)

*Primary Examiner*—Eric Thomas
(74) *Attorney, Agent, or Firm*—Dority & Manning, P.A.

(57) ABSTRACT

An electrolytic capacitor that includes an anode body formed from a powder comprising electrically conductive ceramic particles and a non-metallic element in an amount of about 100 parts per million or more is provided in one embodiment of the invention. The non-metallic element has a ground state electron configuration that includes five valence electrons at an energy level of three or more. Examples of such elements include, for instance, phosphorous, arsenic, antimony, and so forth. The capacitor also comprises a dielectric layer overlying the anode body and an electrolyte layer overlying the dielectric layer.

18 Claims, 4 Drawing Sheets

U.S. PATENT DOCUMENTS

| | | | |
|---|---|---|---|
| 5,473,503 A | 12/1995 | Sakata et al. | |
| 5,495,386 A | 2/1996 | Kulkarni | |
| 5,729,428 A | 3/1998 | Sakata et al. | |
| 5,812,367 A | 9/1998 | Kudoh et al. | |
| 5,949,639 A | 9/1999 | Maeda et al. | |
| 5,993,513 A | 11/1999 | Fife | |
| 6,051,044 A | 4/2000 | Fife | |
| 6,072,694 A | 6/2000 | Hahn et al. | |
| 6,115,235 A | 9/2000 | Naito | |
| 6,165,623 A | 12/2000 | Fife et al. | |
| 6,191,936 B1 | 2/2001 | Webber et al. | |
| 6,193,779 B1 | 2/2001 | Reichert et al. | |
| 6,197,252 B1 | 3/2001 | Bishop et al. | |
| 6,312,642 B1 | 11/2001 | Fife | |
| 6,322,912 B1 | 11/2001 | Fife | |
| 6,338,816 B1 | 1/2002 | Fife | |
| 6,373,685 B1 | 4/2002 | Kimmel et al. | |
| 6,375,704 B1 | 4/2002 | Habecker et al. | |
| 6,391,275 B1 | 5/2002 | Fife | |
| 6,402,066 B1 | 6/2002 | Habecker et al. | |
| 6,416,730 B1 | 7/2002 | Fife | |
| 6,420,043 B1 | 7/2002 | Fife et al. | |
| 6,455,443 B1 | 9/2002 | Eckert et al. | |
| 6,462,934 B2 | 10/2002 | Kimmel et al. | |
| 6,517,645 B2 | 2/2003 | Fife | |
| 6,522,527 B2 | 2/2003 | Kojima et al. | |
| 6,527,937 B2 | 3/2003 | Fife | |
| 6,563,695 B1 | 5/2003 | Suzuki et al. | |
| 6,576,099 B2 | 6/2003 | Kimmel et al. | |
| 6,592,740 B2 | 7/2003 | Fife | |
| 6,616,728 B2 | 9/2003 | Fife | |
| 6,639,787 B2 | 10/2003 | Kimmel et al. | |
| 6,674,635 B1 | 1/2004 | Fife et al. | |
| 6,702,869 B2 | 3/2004 | Habecker et al. | |
| 6,706,240 B2 | 3/2004 | Habecker et al. | |
| 6,759,026 B2 | 7/2004 | Kimmel et al. | |
| 6,821,314 B1 | 11/2004 | Reichert et al. | |
| 6,835,225 B2 | 12/2004 | Naito et al. | |
| 6,896,715 B2 | 5/2005 | Fife | |
| 6,987,663 B2 * | 1/2006 | Merker et al. | 361/523 |
| 7,025,795 B2 | 4/2006 | Monden et al. | |
| 7,116,548 B2 | 10/2006 | Satterfield, Jr. et al. | |
| 7,132,006 B2 | 11/2006 | Omori et al. | |
| 7,149,074 B2 | 12/2006 | Kimmel et al. | |
| 7,156,893 B2 | 1/2007 | Habecker et al. | |
| 7,157,073 B2 | 1/2007 | Motchenbacher et al. | |
| 7,220,397 B2 | 5/2007 | Kimmel et al. | |
| 7,241,436 B2 | 7/2007 | Fife | |
| 7,262,511 B2 | 8/2007 | Osako et al. | |
| 7,666,247 B2 * | 2/2010 | He et al. | 75/252 |
| 2002/0152842 A1 * | 10/2002 | Oda et al. | 75/252 |
| 2004/0237714 A1 | 12/2004 | Habecker et al. | |
| 2005/0013765 A1 | 1/2005 | Thomas et al. | |
| 2005/0019581 A1 | 1/2005 | Schnitter | |
| 2005/0103638 A1 | 5/2005 | Schnitter et al. | |
| 2005/0150576 A1 | 7/2005 | Venigalla | |
| 2005/0199321 A1 | 9/2005 | Spaniol | |
| 2005/0225927 A1 * | 10/2005 | Tagusagawa et al. | 361/271 |
| 2007/0068341 A1 | 3/2007 | Cheng et al. | |
| 2007/0072362 A1 | 3/2007 | Tseng et al. | |
| 2007/0121276 A1 | 5/2007 | Uzawa et al. | |

FOREIGN PATENT DOCUMENTS

| | | |
|---|---|---|
| EP | 0367068 A2 | 5/1990 |
| EP | 0367068 A3 | 5/1990 |
| GB | 1483989 | 8/1977 |
| GB | 2454049 A | 4/2009 |
| JP | 62268121 A | 11/1987 |
| JP | 9306792 A | 11/1997 |
| JP | 2008010747 A * | 1/2008 |
| SU | 1057995 A | 11/1983 |
| WO | WO 9738143 A1 | 10/1997 |
| WO | WO 9819811 A1 | 5/1998 |
| WO | WO 9838660 A1 | 9/1998 |
| WO | WO 2005045860 A1 | 5/2005 |
| WO | WO 2005076297 A1 | 8/2005 |
| WO | WO 2006057455 A1 | 6/2006 |
| WO | WO 2007020458 A1 | 2/2007 |
| WO | WO 2007020464 A1 | 2/2007 |
| WO | WO 2007026165 A1 | 3/2007 |
| WO | WO 2007130483 A2 | 11/2007 |
| WO | WO 2007130483 A3 | 11/2007 |

OTHER PUBLICATIONS

Abstract of Canadian Patent No. CA 2 018 346 dated Dec. 8, 1990.
Abstract of Japanese Patent No. JP1176226 dated Jul. 12, 1989.
Abstract of Japanese Patent No. JP2038501 dated Feb. 7, 1990.
Abstract of Japanese Patent No. JP3023222 dated Jan. 31, 1991.
Abstract of Japanese Patent No. JP4070594 dated Mar. 5, 1992.
*Adsorption of Gases in Multimolecular Layers*, Brunauer et al., The Journal of the American Chemical Society, vol. 60, Feb. 1938, pp. 309-319.
*Change in Porous Structure and Leakage Currents of Niobium Capacitor Anodes During Electrolytic Oxidation*, Levinskiy, et al., Poroshkovaya Metallurgiya, No. e, 1991, pp. 56-59.
*Charge Carrier Transport and Storage in NbO Capacitors*, Sikula et al., CARTS Europe, Oct. 21, 2004, 4 pages.
*Conductivity Mechanisms and Breakdown Characteristics of Niobium Oxide Capacitors*, Hlavka et al., AVX Corporation 2003, 5 pages.
*Conductivity Mechanisms and Breakdown of NbO Capacitors*, Hlavka et al., CARTS USA, Mar. 19, 2004, 7 pages.
*Dynamic Phenomena in Superconducting Oxides Measured by ESR*, Acrivos et al., Physical Review B, vol. 50, No. 18, Nov. 1, 1994, pp. 13.710-13.723.
*Dynamics of Flux Motion Observed by ESR in Superconducting Oxides*, Acrivos et al., Physics C 235-240, 1994, pp. 3159-3160.
*Electrical Conductivity in Ceramics and Glass*, Vest et al., Department of the Air Force, Aerospace Research Laboratories, Wright-Patterson Air Force Base, OH., 1974, pp. 375-384.
*Electrochemical characterization of a polypyrrole/$Co_{0.2}CrO_X$ composite as a cathode material for lithium ion batteries*, Ramasamy et al., Journal of Power sources 124, 2003, pp. 197-203.
*Electrolytic Capacitors*, Electrochemical Society Reviews and News, vol. 24, No. 12, Dec. 1977, pp. 408C-409-C.
Encyclopedia of Chemical Technology entitled *Nickel and Nickel Alloys to Paint*, vol. 17, 4th Edition, pp. 59 and 65-66.
*Extended Range NbO Capacitors Through Technology and Materials Enhancements*, Zednicek, et al., CARTS USA, Mar. 24, 2005, 5 pages.
*General Characteristics of the Film-Forming Metals: The Relation Between Overpotential and the Fields in the Oxide and Across the Interfaces*, Young, Chapter 2, pp. 4-5.
*Growth of thin-film niobium oxide layers by molecular-beam epitaxy*, Petrucci et al., J. Appl. Phys. 63(3), Feb. 1, 1988, pp. 900-909.
*Heat Field Stability and Crystallization Peculiarities of Amorphous $Nb_2O_5$ Films*, Palatnik et al., Fizika I Khimiya Obrabotki Materialov, No. 5, 1982, pp. 87-94.
*High-Capacitance Supercapacitor Using a Nanocomposite Electrode of Single-Walled Carbon Nanotube and Polypyrrole*, An et al., Journal of The Electrochemical Society, vol. 149, No. 8, 2002, pp. A1058-A1062.
*Investigation of Columbium as an Electrolytic Capacitor Anode, Part II*, Peabody, U.S. Army Signal Research and Development Laboratory, Fort Monmouth, NJ, DA Task Nr. 3a99-15-003-04, 1962, pp. 1-11.
*Low ESR and Low Profile Technology on Niobium Oxide*, Zednicek et al., AVX Corporation 2003, 9 pages.
*Mechanism of leakage current reduction of tantalum oxide capacitors by titanium doping*, Lau et al., Applied Physics Letters 90, 2007, pp. 112903-1-112903-3.

*NbO Capacitor Parameters Improvement, Leakage Current Mechanism and Anodic Oxidation*, Šikula et al., Mar. 30, 2005, 7 pages.
*New Tantalum Technologies, Tantalum Polymer, and Niobium Oxide Capacitors*, T. Zedniček, CARTS Europe Prague, Oct. 19, 2005, 7 pages.
*Niobium Compounds and Alloys*, J. Eckert, Int. J. of Refractory Metals & Hard Materials, vol. 12, 1993-1994, pp. 335-340.
*Niobium Oxide and Tantalum Capacitors: M-I-S Model Parameters Comparison*, Sikula et al., CARTS USA, Mar. 24, 2005, 4 pages.
*Niobium Oxide set to beat the pants off tants*, CIE (Components in Electronics), Aug. 2007.
*Niobium Oxide Technology Roadmap*, Zednicek et al., AVX Corporation, T. Zednicek et al., CARTS Europe Nice, Oct. 15, 2002, 5 pages.
*Niobium Physico-Chemical Properties of Its Compounds and Alloys*, Feschotte et al., International Atomic Energy Review, Special Issue No. 2, 1968, pp. 56-59.
*Niobium Solid Electrolytic Capacitors*, Schwartz et al., Journal of the Electrochemical Society, vol. 108, No. 8, Aug. 1961, pp. 750-757.
*Note on the Crystal Structure of Niobium Dioxide*, Magneli et al., Acta Chem. Scand. 9, No. 8, 1955.
*Oxidative coupling of methane over NbO (p-type) and $Nb_2O_5$ (n-type) semiconductor materials*, Erarslanoglu et al., Catalysis Letters 38, 1996, pp. 215-218.
*Phosphoric Acid Passivated Niobium and Tantalum EIS-Comparative Study*, Al-Kharafi et al., Electrochimica Acta, vol. 40, No. 16, 1995, pp. 2623-2626.
*Preparation and Chlorination of $NbO_2$ and NbO and NbC*, Baba et al., Journal of Mining and Metallurgical Inst. of Japan, vol. 82, No. 942, 1966, pp. 855-860.
*Quality of Niobium Oxide Semiconductor Capacitors as a Function of Chemical Composition of the Niobium Powder*, Bord et al., No. 1 (46), 1982, pp. 11-15.
*Study of NbO by neutron diffraction of inelastic scattering of neutrons*, V. V. Sumin, Sov. Phys. Crystallogr. 34(3), May-Jun. 1989, pp. 391-393.
*Study of Oxygen Solubility in Niobium*, Orlov et al., Izvestiya Akademii Nauk SSSR, Metally, No. 5, 1985, pp. 202-205.
*Superconductivity in the System Ln-Sr-Nb-O (Ln = La, Nd, Gd, Dy, Tm, Lu)*, Kuz'micheva et al., Russian Journal of Inorganic Chemistry, vol. 38, No. 1, 1993, pp. 149-153.

*The crystal structure of niobium monoxide*, Bowman et al., Los Alamos Scientific Laboratory, University of California, Los Alamos, NM, Jun. 4, 1966.
*The Formation of the Lower Oxides of Niobium and Tantalum in Some Reactions of Reduction and Oxidation*, Lapitskii et al., Zhurnal Neorganischeskoi Khimii (Journal of Inorganic Chemistry, USSR), vol. II, No. 1, 1957, pp. 80-91.
*The Influence of Gas Atmospheres on the First Stage Sintering of High Purity Niobium Powders*, Krehl et al., Metallurgical Transactions, vol. 15A, Jun. 1984, pp. 1111-1116.
*The Microstructure of Slightly Substoichiometric $NbO_1$*, Gannon et al, Journal of Solid State Chemistry, vol. 20, 1977, pp. 331-344.
*The Oxides of Niobium*, Georg Bauer, Zeitschrift fuer anorganische und allgemeine Chemie, vol. 248, No. 1, Sep. 12, 1941, pp. 1-31.
*The Stabilization of Niobium-Based Solid Electrolyte Capacitors*, Qiu et al., Active and Passive Elec. Comp., vol. 25, 2002, pp. 201-209.
*The Use of Niobium as an Anode Material in Liquid Filled Electrolytic Capacitors*, Jackson et al., Electrocomponent Science and Technology, vol. 1, 1974, pp. 27-37.
*Transport and Noise Characteristics of Niobium Oxide and Tantalum Capacitors*, Sikula et al., 4 pages.
Catalog—Alfa Æ.sar—The Right Chemicals/The Right Chemistry, 1995-1996, 1 page.
Chapter entitled *The Lower Oxides of Columbium* by Mellor from A Comprehensive Treatise on Inorganic and Theoretical Chemistry, vol. IX, 1923, pp. 856-857.
Chemical Structure of gamma-Glycidoxypropyltrimethoxysilane from Si Power Chemical Corporation—SiSiB® Silane Coupling Agent, SiSiB® PC3100.
Form—Related U.S. Patent Applications.
Material Safety Data Sheet for Niobium Oxide, Jun. 1994, ESPI Metals.
Technical Report—*Niobium Solid Electrolytic Capacitors*, Mifune et al., National Technical Report 9, 1963, 17 pages.
Translation of SU 1,556,420 entitled *Material for Anodes of Electrolytic and Oxide-Semiconductor Capacitors*, by Yelyutin et al., Jul. 28, 1987.
Z. anorg. Allg. Chemie, vol. 317, 1962, pp. 321-333.
UK Search Report for GB0814675.5 dated Apr. 30, 2009, 3 pages.

\* cited by examiner

DOPED CERAMIC POWDER FOR USE IN FORMING CAPACITOR ANODES

BACKGROUND OF THE INVENTION

Electrolytic capacitors are often formed from valve action materials that are capable of being oxidized to form a dielectric layer. Typical valve action metals are niobium and tantalum. More recently, capacitors have been developed that employ an anode made from an electrically conductive oxide of niobium and a niobium pentoxide dielectric. Niobium oxide based capacitors have significant advantages over tantalum capacitors. For example, niobium oxide is more widely available and potentially less expensive to process than tantalum. Niobium oxide capacitors are also more stable against further oxidation and thus less prone to thermal runaway when over-voltaged (or otherwise over-loaded) than tantalum and niobium. Further, niobium oxide has several orders of magnitude higher minimum ignition energy compared to niobium and tantalum. Niobium oxide capacitors may also have a unique high resistance failure mechanism that limits the leakage current to a level below the capacitor's thermal runaway point.

Despite the many benefits afforded by such ceramic-based (e.g., niobium oxide) capacitors, their use in high voltage applications (e.g., rated voltage of 16, 20 or 35 volts) has often been limited due to the relatively low breakdown strength of the dielectric. Generally speaking, as the charge and voltage on a capacitor is increased, free electrons will eventually become accelerated to velocities that can liberate additional electrons during collisions with neutral atoms or molecules in a process called avalanche breakdown. Breakdown occurs quite abruptly (typically in nanoseconds), resulting in the formation of an electrically conductive path and a disruptive discharge through the material. Capacitor damage or destruction can occur in such situations. In niobium oxide capacitors, it is believed that the oxygen vacancies of $Nb_2O_{5-x}$ act as electron donors that cause the anodic oxide to function as an n-type semiconductor. Unfortunately, it is believed that Schottky-type point defects are prevalent in the n-type semiconductor in which oxygen atoms leave their site in the lattice structure (thereby creating an oxygen vacancy) and move to the areas with lower concentration. In the case of niobium oxide capacitors, it is believed that the oxygen gradient on the interface between the niobium monoxide anode and niobium pentoxide dielectric drives the oxygen atoms to diffuse into the areas with lower concentration in the niobium monoxide, thereby creating oxygen vacancies in the dielectric. Those defects may form deep traps in the dielectric, which can store the electrical charge and serve as the source of charge carrier transport by Poole-Frenkel and tunneling mechanisms under the application of DC voltage. The application of high voltage and temperature further accelerates the oxygen diffusion and increases the number of defects in dielectric. This leads to leakage current instability at accelerated temperature and voltage load, which may limit the use of such capacitors at higher application voltages.

As such, a need currently exists for an electrolytic capacitor formed from a ceramic-based anode that is able to operate at relatively high voltages.

SUMMARY OF THE INVENTION

In accordance with one embodiment of the present invention, an electrolytic capacitor is disclosed that comprises an anode body formed from a powder comprising electrically conductive ceramic particles and a non-metallic element in an amount of about 100 parts per million or more. The non-metallic element has a ground state electron configuration that includes five valence electrons at an energy level of three or more. Examples of such elements include, for instance, phosphorous, arsenic, antimony, and so forth. The capacitor also comprises a dielectric layer overlying the anode body and an electrolyte layer overlying the dielectric layer.

In accordance with another embodiment of the present invention, a ceramic powder for use in the formation of capacitor anodes is disclosed. The ceramic powder comprises electrically conductive ceramic particles and has a phosphorous content of about 200 parts per million or more. In still another embodiment, a method for forming a capacitor anode is disclosed that comprises doping electrically conductive ceramic particles with a phosphorus dopant to form a powder having a phosphorous content of about 200 parts per million or more. The powder is compacted to form a pressed pellet and sintered.

Other features and aspects of the present invention are set forth in greater detail below.

BRIEF DESCRIPTION OF THE DRAWINGS

A full and enabling disclosure of the present invention, including the best mode thereof, directed to one of ordinary skill in the art, is set forth more particularly in the remainder of the specification, which makes reference to the appended figures in which.

Figure 1:
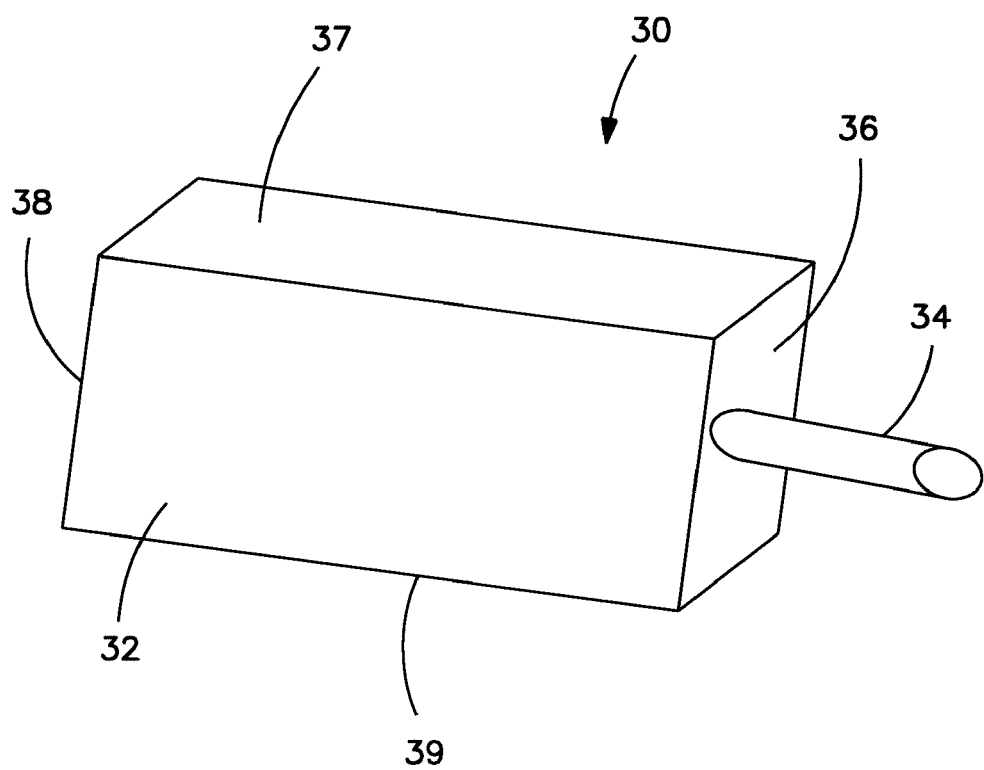
FIG. 1 is a perspective view of one embodiment of an electrolytic capacitor of the present invention.

Repeat use of references characters in the present specification and drawings is intended to represent same or analogous features or elements of the invention.

DETAILED DESCRIPTION OF REPRESENTATIVE EMBODIMENTS

It is to be understood by one of ordinary skill in the art that the present discussion is a description of exemplary embodiments only, and is not intended as limiting the broader aspects of the present invention, which broader aspects are embodied in the exemplary construction.

Generally speaking, the present invention is directed to an electrically conductive ceramic powder for use in forming capacitor anodes. The powder typically has a high specific charge, such as about 25,000 microFarads*Volts per gram ("µF*V/g") or more, in some embodiments about 40,000 µF*V/g or more, in some embodiments about 60,000 µF*V/g or more, in some embodiments about 70,000 µF*V/g or more, and in some embodiments, about 80,000 to about 200,000 µF*V/g or more. Examples of ceramic particles for using in forming such powders include oxides of valve metals, such as tantalum, niobium, etc. One particularly effective type of ceramic particle for use in the present invention is an electrically conductive oxide of niobium, such as niobium oxide having an atomic ratio of niobium to oxygen of 1:less than 2.5, in some embodiments 1:less than 1.5, in some embodiments 1:1.0±0.1, and in some embodiments, 1:1.0±0.05. For example, the niobium oxide may be $NbO_{0.7}$, $NbO_{1.0}$, $NbO_{1.1}$, and $NbO_2$. In a preferred embodiment, the ceramic particles contain $NbO_{1.0}$, which is a conductive niobium oxide that may remain chemically stable even after sintering at high temperatures. Examples of such valve metal oxides are described in U.S. Pat. Nos. 6,322,912 to Fife; 6,391,275 to Fife et al.; 6,416,730 to Fife et al.; 6,527,937 to Fife; 6,576,099 to Kimmel, et al.; 6,592,740 to Fife, et al.; and 6,639,787 to Kimmel, et al.; and 7,220,397 to Kimmel, al., as well as U.S. Patent Application Publication Nos. 2005/0019581 to Schnitter; 2005/0103638 to Schnitter, et al.; 2005/0013765 to Thomas, et al., all of which are incorporated herein in their entirety by reference thereto for all purposes.

The ceramic particles may possess any desired shape or size. For example, the particles may be flaked, angular, nodular, and mixtures or variations thereof. The particles also typically have a screen size distribution of at least about 60 mesh, in some embodiments from about 60 to about 325 mesh, and in some embodiments, from about 100 to about 200 mesh. Further, the specific surface area is from about 0.1 to about 10.0 $m^2/g$, in some embodiments from about 0.5 to about 5.0 $m^2/g$, and in some embodiments, from about 1.0 to about 2.0 $m^2/g$. The term "specific surface area" refers to the surface area determined by the physical gas adsorption (B.E.T.) method of Bruanauer, Emmet, and Teller, Journal of American Chemical Society, Vol. 60, 1938, p. 309, with nitrogen as the adsorption gas. Likewise, the bulk (or Scott) density is typically from about 0.1 to about 5.0 grams per cubic centimeter ($g/cm^3$), in some embodiments from about 0.2 to about 2.5 $g/cm^3$, and in some embodiments, from about 0.5 to about 1.5 $g/cm^3$.

In accordance with the present invention, the ceramic powder also contains a "non-metallic element", which includes true non-metals (e.g., phosphorous) as well as metalloids, such as elements that can form amphoteric oxides and/or behave as semi-metals (e.g., antimony). The non-metallic element has a ground state electron configuration that contains five (5) valence electrons at an energy level of three (3) or higher. Without intending to be limited by theory, it is believed that such an electron configuration may provide the element with the ability to bond to free oxygen electrons and thus block their movement from the dielectric into the ceramic anode. Such an electronic configuration is also believed to allow the element to readily dissolve into a dielectric matrix having five (5) valence electrons (e.g., $Nb_2O_5$ or $Ta_2O_5$).

Suitable non-metallic elements for use in an anode of the present invention may include, for instance, phosphorous, antimony, arsenic, and so forth. Phosphorus, for example, has a ground state electronic configuration of $1s^2 2s^2 2p^6 3s^2 3p_x^1 3p_y^1 3p_z^1$. To form five (5) covalent bonds, one of the electrons in the 3s orbital may be promoted to one of the 3d orbitals. The 3-level electrons hybridize themselves to give 5 hybrid orbitals, all of equal energy (i.e., $dsp^3$ hybrids), which can share space with electrons from five (5) oxygen atoms to make five (5) new molecular orbitals and thus five (5) covalent bonds. Similar to phosphorous, both antimony and arsenic possess an electron configuration that contains an electron in an "s" orbital that may be promoted to a higher energy state. For example, arsenic contains an electron in the 4s orbital that may be promoted to the 4d orbital, which then hybridizes to five (5) $dsp^3$ hybrids. Likewise, antimony contains an electron in the 5s orbital that may be promoted to the 5d orbital, which then hybridizes to five (5) $dsp^3$ hybrids. Nitrogen, on the other hand, has an electron configuration of $1s^2 2s^2 2p_x^1 2p_y^1 2p_z^1$. Because the energy gap from the 2s energy level to the 3s energy level is generally large, promotion of a 2s electron generally does not occur, which means that nitrogen typically does not form five (5) covalent bonds.

The non-metallic element is generally incorporated into the ceramic powder via a dopant. Any dopant may be suitable for use in the present invention that is capable of delivering the desired concentration of the non-metallic element and that does not have a significant adverse effect on the electrical properties of the powder. In one embodiment, for example, the dopant may be a compound that contains at least one metal (e.g., tantalum, niobium, aluminum, gallium, indium, thalium, etc.) and at least one non-metallic element (e.g., phosphorous, arsenic, and antimony). One class of suitable dopants for use in the present invention are metal phosphides, which may be provided in powder form and thus readily blended with the ceramic particles. Exemplary metal phosphides include, for instance, iron phosphide, zinc phosphide, titanium phosphide, manganese phosphide, tin phosphide, copper phosphide, nickel phosphide, tantalum phosphide, chromium phosphide, niobium phosphide, lithium phosphide, sodium phosphide, magnesium phosphide, cadmium phosphide, molybdenum phosphide, tungsten phosphide, vanadium phosphide, zirconium phosphide, cobalt phosphide, hafnium phosphide, barium phosphide, boron phosphide, aluminum phosphide, gallium phosphide, indium phosphide, iridium phosphide, scandium phosphide, yttrium phosphide, lanthanum phosphide, cerium phosphide, praseodymium phosphide, terbium phosphide, erbium phosphide, dysprosium phosphide, holmium phosphide, neodymium phosphide, samarium phosphide, germanium phosphide, calcium phosphide, silver phosphide, platinum phosphide, gadolinium phosphide, aluminum gallium phosphide, gallium indium phosphide, aluminum gallium indium phosphide, gallium indium arsenic phosphide, etc. When the ceramic particles are formed from an oxide of niobium, the use of niobium phosphide as a dopant may be particularly desirable to improve the compatibility of the dopant and ceramic particles.

Of course, other dopants may also be employed in the present invention. In certain embodiments, for example, the dopant may be a phosphoric acid, as well as a salt or ester thereof, such as ammonium phosphates, gallium phosphates, alkyl phosphates, etc. Phosphorous may also be introduced in the form of a mixture of phosphoric acid and another compound, such as a basic organic compound containing nitrogen (e.g., ammonia, primary and secondary amines, cyclic amines, compounds of the pyridine family and quinolines and compounds from the pyrrole family).

A variety of techniques may be employed to incorporate the dopant into the powder. In one embodiment, for example, the dopant is simply mixed with the electrically conductive ceramic particles. Alternatively, the dopant may be applied to a starting material (e.g., $Nb_2O_5$) that is subsequently heat treated in the presence of a getter material (e.g., tantalum or niobium) to form an oxygen reduced and electrically conductive ceramic (e.g., NbO). Heat treatment typically occurs in an atmosphere that facilitates the transfer of oxygen atoms from the starting oxide to the getter material. For example, the heat treatment may occur in a reducing atmosphere, such as in a vacuum, inert gas, hydrogen, etc. The reducing atmosphere may be at a pressure of from about 10 Torr to about 2000 Torr, in some embodiments from about 100 Torr to about 1000 Torr, and in some embodiments, from about 100 Torr to about 930 Torr. Typically, heat treatment occurs at a temperature of from about from about 800° C. to about 1900° C., in some embodiments from about 1000° C. to about 1500° C., and in some embodiments, from about 1100° C. to about 1400° C., for a time of from about 5 minutes to about 100 minutes, and in some embodiments, from about 30 minutes to about 60 minutes.

To achieve the desired improvement in the dielectric properties, the non-metallic element is present in an amount of about 100 parts per million ("ppm") or more, in some embodiments about 200 ppm or more, in some embodiments about 400 ppm or more, in some embodiments about 500 ppm or more, in some embodiments about 800 ppm or more, in some embodiments about 1,000 ppm or more, in some embodiments about 1,500 ppm to about 10,000 ppm, and in some embodiments, about 3,000 ppm to about 5,000 ppm. Even at such high levels, it has been discovered that such non-metallic elements do not significantly retard the sintering activity of the ceramic particles.

To facilitate formation of the anode, other components may also be added to the ceramic particles or dopant, either before or after they are mixed together. For example, the ceramic particles and dopant may be optionally mixed with a binder and/or lubricant to ensure that the particles adequately adhere to each other when pressed to form the anode body. Suitable binders may include camphor, stearic and other soapy fatty acids, Carbowax (Union Carbide), Glyptal (General Electric), polyvinyl alcohols, napthaline, vegetable wax, and microwaxes (purified paraffins). The binder may be dissolved and dispersed in a solvent. Exemplary solvents may include water, alcohols, etc. When utilized, the percentage of binders and/or lubricants may vary from about 0.1% to about 8% by weight of the total mass. It should be understood, however, that binders and lubricants are not required in the present invention.

Once formed, the powder may be compacted using any conventional powder press mold. For example, the press mold may be a single station compaction press using a die and one or multiple punches. Alternatively, anvil-type compaction press molds may be used that use only a die and single lower punch. Single station compaction press molds are available in several basic types, such as cam, toggle/knuckle and eccentric/crank presses with varying capabilities, such as single action, double action, floating die, movable platen, opposed ram, screw, impact, hot pressing, coining or sizing. The powder may be compacted around an anode wire (e.g., tantalum wire). It should be further appreciated that the anode wire may alternatively be attached (e.g., welded) to the anode body subsequent to pressing and/or sintering of the anode body. After compression, any binder/lubricant may be removed by heating the pellet under vacuum at a certain temperature (e.g., from about 150° C. to about 500° C.) for several minutes. Alternatively, the binder/lubricant may also be removed by contacting the pellet with an aqueous solution, such as described in U.S. Pat. No. 6,197,252 to Bishops et al., which is incorporated herein in its entirety by reference thereto for all purposes. Thereafter, the pellet is sintered to form a porous, integral mass. For example, in one embodiment, the pellet may be sintered at a temperature of from about 1200° C. to about 2000° C., and in some embodiments, from about 1500° C. to about 1800° C. under vacuum. Upon sintering, the pellet shrinks due to the growth of bonds between the particles. In addition to the techniques described above, any other technique for forming the anode body may also be utilized in accordance with the present invention, such as described in U.S. Pat. Nos. 4,085,435 to Galvagni; 4,945,452 to Sturmer, et al.; 5,198,968 to Galvagni; 5,357,399 to Salisbury; 5,394,295 to Galvagni, et al.; 5,495,386 to Kulkarni; and 6,322,912 to Fife, which are incorporated herein in their entirety by reference thereto for all purposes.

Although not required, the thickness of the anode body may be selected to improve the electrical performance of the capacitor. For example, the thickness of the anode body may be about 4 millimeters or less, in some embodiments, from about 0.2 to about 3 millimeters, and in some embodiments, from about 0.4 to about 1 millimeter. Such a relatively small anode thickness (i.e., "low profile") helps dissipate heat generated by the high specific charge powder and also provide a shorter transmission path to minimize ESR and inductance. The shape of the anode body may also be selected to improve the electrical properties of the resulting capacitor. For example, the anode body may have a shape that is curved, sinusoidal, rectangular, U-shaped, V-shaped, etc. The anode body may also have a "fluted" shape in that it contains one or more furrows, grooves, depressions, or indentations to increase the surface to volume ratio to minimize ESR and extend the frequency response of the capacitance. Such "fluted" anodes are described, for instance, in U.S. Pat. Nos. 6,191,936 to Webber, et al.; 5,949,639 to Maeda, et al.; and 3,345,545 to Bourgault et al., as well as U.S. Patent Application Publication No. 2005/0270725 to Hahn, et al., all of which are incorporated herein in their entirety by reference thereto for all purposes.

Once formed, the anode may be anodized so that a dielectric layer is formed over and within the anode. Anodization is an electrical chemical process by which the anode is oxidized to form a material having a relatively high dielectric constant. For example, a niobium oxide (NbO) anode may be anodized to form niobium pentoxide ($Nb_2O_5$). Specifically, in one embodiment, the niobium oxide anode is dipped into a weak acid solution (e.g., phosphoric acid, polyphosphoric acid, mixtures thereof, and so forth) at an elevated temperature (e.g., about 85° C.) that is supplied with a controlled voltage and current to form a niobium pentoxide coating having a certain thickness. The power supply is initially kept at a constant current until the required formation voltage is reached. Thereafter, the power supply is kept at a constant voltage to ensure that the desired dielectric thickness is formed over the surface of the anode. The anodization voltage typically ranges from about 10 to about 200 volts, and in some embodiments, from about 20 to about 100 volts. In addition to being formed on the surface of the anode, a portion of the dielectric oxide film will also typically form on the surfaces of the pores of the material. It should be understood that the dielectric layer may be formed from other types of materials and using different techniques.

Once the dielectric layer is formed, a protective coating may optionally be applied, such as one made of a relatively insulative resinous material (natural or synthetic). Such materials may have a resistivity of greater than about 0.05 ohm-cm, in some embodiments greater than about 5, in some embodiments greater than about 1,000 ohm-cm, in some embodiments greater than about $1 \times 10^5$ ohm-cm, and in some embodiments, greater than about $1 \times 10^{10}$ ohm-cm. Some resinous materials that may be utilized in the present invention include, but are not limited to, polyurethane, polystyrene, esters of unsaturated or saturated fatty acids (e.g., glycerides), and so forth. For instance, suitable esters of fatty acids include, but are not limited to, esters of lauric acid, myristic acid, palmitic acid, stearic acid, eleostearic acid, oleic acid, linoleic acid, linolenic acid, aleuritic acid, shellolic acid, and so forth. These esters of fatty acids have been found particularly useful when used in relatively complex combinations to form a "drying oil", which allows the resulting film to rapidly polymerize into a stable layer. Such drying oils may include mono-, di-, and/or tri-glycerides, which have a glycerol backbone with one, two, and three, respectively, fatty acyl residues that are esterified. For instance, some suitable drying oils that may be used include, but are not limited to, olive oil, linseed oil, castor oil, tung oil, soybean oil, and shellac. These and other protective coating materials are described in more detail U.S. Pat. No. 6,674,635 to Fife, et al., which is incorporated herein in its entirety by reference thereto for all purposes.

The anodized part is thereafter subjected to a step for forming cathodes according to conventional techniques. In some embodiments, for example, the cathode is formed by pyrolytic decomposition of manganous nitrate ($Mn(NO_3)_2$) to form a manganese dioxide ($MnO_2$) cathode. Such techniques are described, for instance, in U.S. Pat. No. 4,945,452 to Sturmer, et al., which is incorporated herein in its entirety by reference thereto for all purposes. Alternatively, a conductive polymer coating may be used to form the cathode of the capacitor. The conductive polymer coating may contain one or more conductive polymers, such as polypyrroles; polythiophenes, such as poly(3,4-ethylenedioxy thiophene) (PEDT); polyanilines; polyacetylenes; poly-p-phenylenes; and derivatives thereof. Moreover, if desired, the conductive polymer coating may also be formed from multiple conductive polymer layers. For example, in one embodiment, the conductive polymer coating may contain one layer formed from PEDT and another layer formed from a polypyrrole. Various methods may be utilized to apply the conductive polymer coating onto the anode part. For instance, conventional techniques such as electropolymerization, screen-printing, dipping, electrophoretic coating, and spraying, may be used to form a conductive polymer coating. In one embodiment, for example, the monomer(s) used to form the conductive polymer (e.g., 3,4-ethylenedioxy thiophene) may initially be mixed with a polymerization catalyst to form a solution. For example, one suitable polymerization catalyst is BAYTRON C, which is iron III toluene-sulphonate and sold by H.C. Starck. BAYTRON C is a commercially available catalyst for BAYTRON M, which is 3,4-ethylene dioxythiophene, a PEDT monomer also sold by H.C. Starck. Once a catalyst dispersion is formed, the anode part may then be dipped into the dispersion so that the polymer forms on the surface of the anode part. Alternatively, the catalyst and monomer(s) may also be applied separately to the anode part. In one embodiment, for example, the catalyst may be dissolved in a solvent (e.g., butanol) and then applied to the anode part as a dipping solution. The anode part may then be dried to remove the solvent therefrom. Thereafter, the anode part may be dipped into a solution containing the appropriate monomer. Once the monomer contacts the surface of the anode part containing the catalyst, it chemically polymerizes thereon. In addition, the catalyst (e.g., BAYTRON C) may also be mixed with the material(s) used to form the optional protective coating (e.g., resinous materials). In such instances, the anode part may then be dipped into a solution containing the conductive monomer (BAYTRON M). As a result, the conductive monomer can contact the catalyst within and/or on the surface of the protective coating and react therewith to form the conductive polymer coating. Although various methods have been described above, it should be understood that any other method for applying the conductive coating(s) to the anode part may also be utilized in the present invention. For example, other methods for applying such conductive polymer coating(s) may be described in U.S. Pat. Nos. 5,457,862 to Sakata, et al., 5,473,503 to Sakata, et al., 5,729,428 to Sakata, et al., and 5,812,367 to Kudoh, et al., which are incorporated herein in their entirety by reference thereto for all purposes.

In most embodiments, once applied, the conductive polymer is healed. Healing may occur after each application of a conductive polymer layer or may occur after the application of the entire conductive polymer coating. In some embodiments, for example, the conductive polymer may be healed by dipping the pellet into an electrolyte solution, such as a solution of phosphoric acid and/or sulfuric acid, and thereafter applying a constant voltage to the solution until the current is reduced to a preselected level. If desired, such healing may be accomplished in multiple steps. For instance, in one embodiment, a pellet having a conductive polymer coating is first dipped in phosphoric acid and applied with about 20 volts and then dipped in sulfuric acid and applied with about 2 volts. In this embodiment, the use of the second low voltage sulfuric acid solution or toluene sulphonic acid can help increase capacitance and reduce the dissipation factor (DF) of the resulting capacitor. After application of some or all of the layers described above, the pellet may then be washed if desired to remove various byproducts, excess catalysts, and so forth. Further, in some instances, drying may be utilized after some or all of the dipping operations described above. For example, drying may be desired after applying the catalyst and/or after washing the pellet in order to open the pores of the pellet so that it can receive a liquid during subsequent dipping steps.

Once the cathode is formed, the part may optionally be applied with a carbon layer (e.g., graphite) and silver layer, respectively. The silver coating may, for instance, act as a solderable conductor, contact layer, and/or charge collector for the capacitor element and the carbon coating may limit contact of the silver coating with the electrolyte. Such coatings may cover some or all of the electrolyte.

Figure 2:
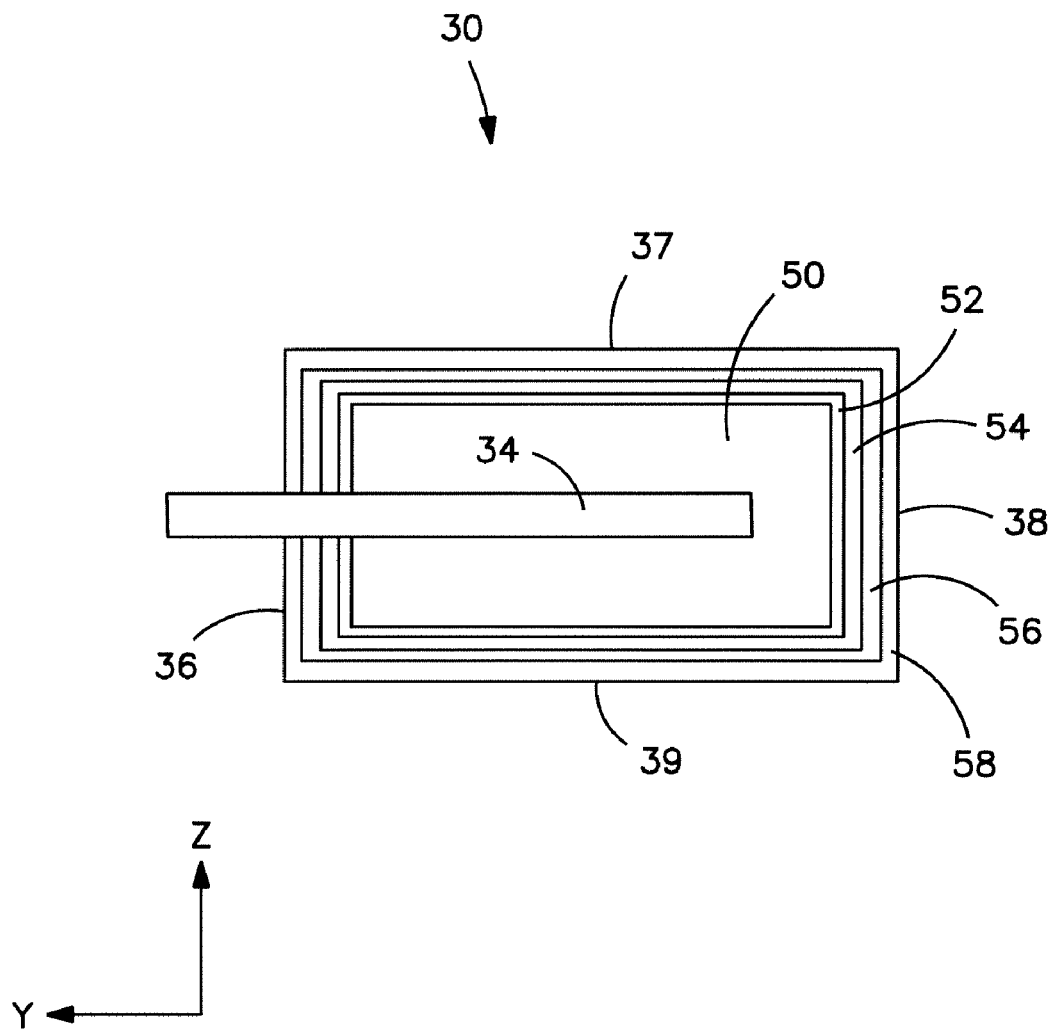
FIG. 2 is a cross-sectional view of the capacitor of FIG. 1 taken along a line 2-2.

The resulting capacitor element may then be terminated using techniques known in the art. Referring to FIGS. 1-2, for example, one embodiment of a capacitor element 30 is shown that has a generally rectangular shape and contains a front surface 36, rear surface 38, top and bottom surfaces 37 and 39, respectively, and side surfaces 32 (only one of which is illustrated). An anode wire 34 extends from the front surface 36 of the capacitor element 30 in a longitudinal direction ("y" direction). As further shown in FIG. 2, the capacitor element 30 contains an anode body 50, a dielectric layer 52 overlying the anode body 50, a solid electrolyte layer 54 overlying the dielectric layer 52, a graphite layer 56 overlying the organic solid electrolyte layer 54, and a silver layer 58 overlying the graphite layer 56. Of course, it should be understood that such layers may be applied to any surface of the capacitor, and need not be applied in the manner illustrated.

Figure 3:
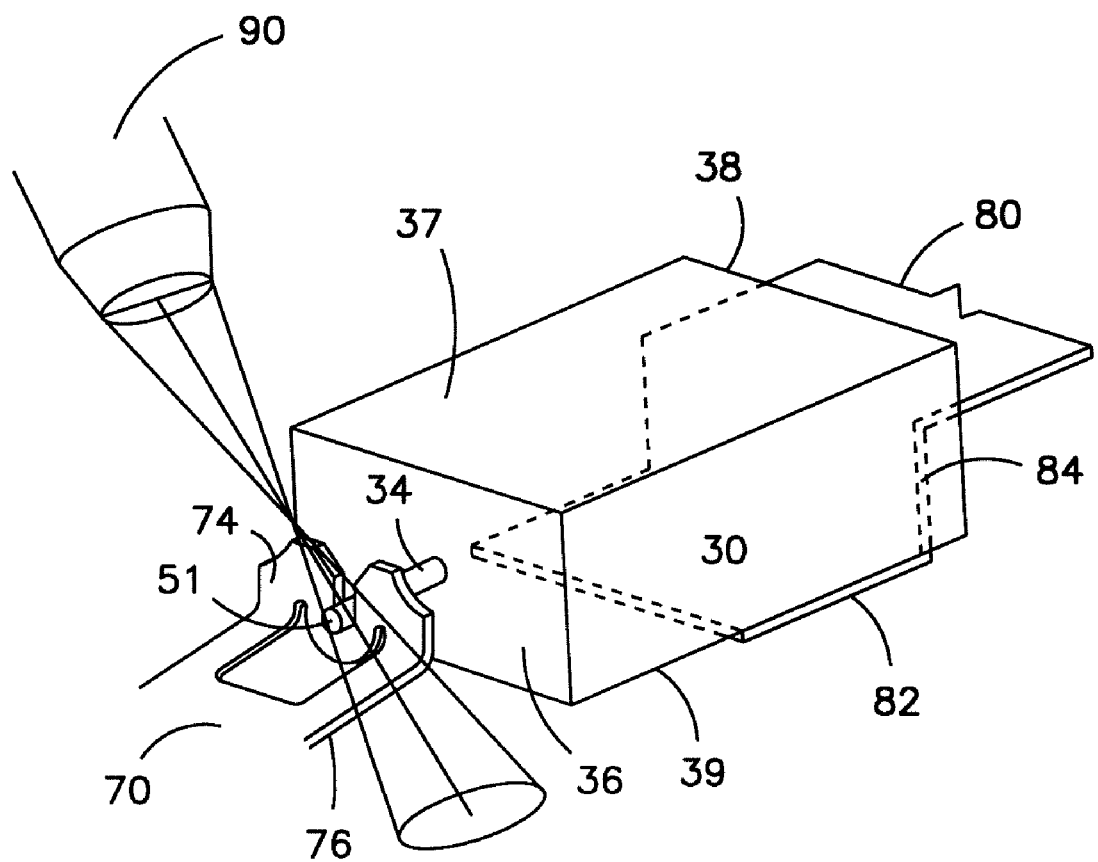
FIG. 3 is a schematic illustration of one embodiment of the present invention for laser welding a capacitor to an anode termination.

Upon formation of the capacitor element 30, anode and cathode termination may be electrically connected to the anode wire 34 and the solid electrolyte 54 layer (via the graphite and silver layers), respectively. The specific configuration of the terminations may vary as is well known in the art. Referring to FIG. 3, for example, one embodiment is shown that includes an anode termination 70 and a cathode termination 80. In this particular embodiment, the cathode termination contains a first portion 82 positioned substantially perpendicular to a second portion 84. The first portion 82 is in electrical contact with the lower surface 39 of the capacitor element 30 and the second portion 84 is in electrical contact with the rear surface 38 of the capacitor element 30. To attach the capacitor element 30 to the cathode termination 80, a conductive adhesive may be employed as is known in the art. The conductive adhesive may include, for instance, conductive metal particles contained with a resin composition. The metal particles may be silver, copper, gold, platinum, nickel, zinc, bismuth, etc. The resin composition may include a thermoset resin (e.g., epoxy resin), curing agent (e.g., acid anhydride), and coupling agent (e.g., silane coupling agents). Suitable conductive adhesives are described in U.S. Patent Application Publication No. 2006/0038304 to Osako, et al., which is incorporated herein in its entirety by reference thereto for all purposes.

Figure 4:
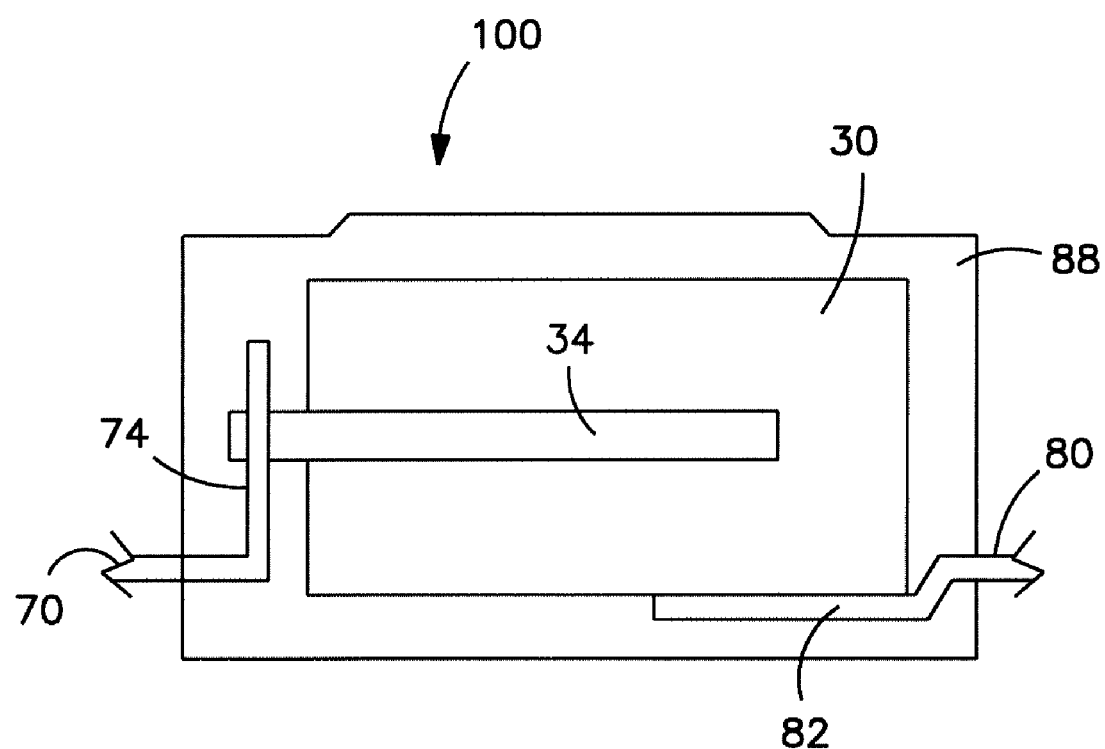
FIG. 4 is a cross-sectional view of a laser welded capacitor formed in accordance with one embodiment of the present invention.

The anode termination 70 contains a first portion 76 positioned substantially perpendicular to a second portion 74. The second portion 74 contains a region that carries the anode wire 34. In the illustrated embodiment, the region 51 possesses a "U-shape" for further enhancing surface contact and mechanical stability of the wire 34. The anode wire 34 is then welded to the region 51 with a laser 90. Once the capacitor element is attached to the terminations, it is enclosed within a resin casing, which may then be filled with silica or any other known encapsulating material. The width and length of the case may vary depending on the intended application. However, the overall thickness of the casing is typically small so that the resultant assembly may be readily incorporated into low profile products (e.g., "IC cards"). For example, the thickness of the casing may range from about 4.0 millimeters or less, in some embodiments, from about 0.1 to about 2.5 millimeters, and in some embodiments, from about 0.15 to about 2.0 millimeters. Suitable casings may include, for instance, "A", "B", "H", or "T" cases (AVX Corporation). Referring to FIG. 4, for example, one particular embodiment of such an encapsulating case for a capacitor assembly 100 is shown as element 88. The encapsulating case 88 provides additional structural and thermal protection for the capacitor assembly 100. After encapsulation, exposed portions of the respective anode and cathode terminations may be aged, screened, and trimmed. If desired, the exposed portions may be optionally bent twice along the outside of the casing 88 (e.g., at an approximately 90° angle).

As a result of the present invention, a capacitor may be formed that exhibits excellent electrical properties. For example, the capacitor of the present invention typically has an ESR less than about 1000 milliohms (mohms), in some embodiments less than about 500 mohms, and in some embodiments, less than about 100 mohms. The equivalent series resistance of a capacitor generally refers to the extent that the capacitor acts like a resistor when charging and discharging in an electronic circuit and is usually expressed as a resistance in series with the capacitor. In addition, the resulting leakage current, which generally refers to the current flowing from one conductor to an adjacent conductor through an insulator, can be maintained at relatively low levels. For example, the numerical value of the normalized leakage current of a capacitor of the present invention is, in some embodiments, less than about 0.1 µA/µF*V, in some embodiments less than about 0.01 µA/µF*V, and in some embodiments, less than about 0.001 µA/µF*V, wherein µA is microamps and uF*V is the product of the capacitance and the rated voltage. Likewise, the breakdown voltage of the capacitor of the present invention may be at least about 10 volts, in some embodiments at least about 15 volts, in some embodiments at least about 20 volts, and in some embodiments, from about 20 volts to about 100 volts. The breakdown voltage for a capacitor may be determined by increasing the applied voltage in increments of 0.5 Volts at a constant current. The voltage at which the capacitor is destroyed is the breakdown voltage.

The present invention may be better understood by reference to the following examples.

TEST PROCEDURES

Equivalent Series Resistance (ESR), Capacitance, and Dissipation Factor:

Equivalence series resistance and impedance were measured using a Keithley 3330 Precision LCZ meter with Kelvin Leads with 0 volts bias and 1 volt signal. The operating frequency was 100 kHz. The capacitance and dissipation factor were measured using a Keithley 3330 Precision LCZ meter with Kelvin Leads with 2 volts bias and 1 volt signal. The operating frequency was 120 Hz and the temperature was 23° C.±2° C.

Leakage Current:

Leakage current ("DCL") was measured using a MC 190 Leakage test set made by Mantracourt Electronics LTD, UK. The MC 190 test measures leakage current at a temperature of 25° C. and at a certain rated voltage after 10 seconds.

Life Testing:

For life testing of a capacitor, it is soldered onto a testing plate and put into an oven under $V_c$ ($0.66 \times V_r = 0.66 \times 16V = 10.6V$) and temperature (125° C.). The leakage current is measured before and after testing. If the value is above a certain predetermined limit (e.g., 1 µA), the sample is designated as "rejected"—"rej." If the value is above the short circuit limit (e.g., 179 µA), the sample is designated as "SC."

Example 1

NbO powder (HC Starck, 80,000 µF*V/g) was manually pre-mixed with niobium phosphide (325 mesh, Alfa Aesar) to obtain final phosphorous concentrations of 100, 200, 500, 1000 ppm. The resulting doped powder was homogenized in a Turbula® powder mixer. An aqueous solution was added to the dry powder that contained a polyethyloxazoline ("PX") binder (2 wt. % PX based on the dry weight of the doped NbO powder). The binder solution and doped powder were manually mixed together. Thereafter, the powder was dried at 85° C. for 4 hours to evaporate the water. The powder was then embedded with a tantalum lead wire and pressed on a top/bottom press machine to a density of 3.4 g/cm³. The binder was then removed by placing the pellet into a nitrogen atmosphere at a temperature of 400° C. to 500° C. The pellet was then sintered at a temperature of 1520° C. for 10 minutes in an argon atmosphere.

To anodize the tantalum anode, it was dipped into a weak phosphoric acid/water solution having a conductivity of 8.6±0.3 mS/cm and temperature of 85±5° C., applied with a voltage of 65V and current higher than 100 mA/g, and washed with deionized water. The entire part was then applied with a manganese dioxide cathode layer as is known in the art. Thereafter, the part was dipped into a graphite dispersion at room temperature and healed for 30 minutes at 125° C. The part was then dipped in a silver dispersion at room temperature and healed for 30 minutes at 125° C. Once the capacitor element was formed, it was then laser welded to a lead frame having a thickness of 0.10 millimeters (NILO as a raw material). The diameter of the anode wire was 0.17 millimeters. Silver loaded adhesive ACE 10131 (Protavic) was used to attach the cathode termination lead (the opposite part of the leadframe). The adhesive was cured at 175° C. for 1 minute. Once the capacitor element was attached to the leadframe, it was then encapsulated to form a standard A case size (AVX) capacitor and cured at 170° C. for 60 seconds.

Once formed, various electrical parameters were measured and twenty-five (25) of the capacitors were subjected to life testing. The results are set forth below.

| Phosphorus content [ppm] | DCL [μA] | Number of DCL rejects after life testing |
|---|---|---|
| 0 | 0.355 | 23 rej |
| 100 | 0.394 | 25 rej |
| 200 | 0.176 | 12 rej |
| 500 | 0.229 | 9 rej |
| 1000 | 0.173 | 2 rej |

As indicated, the leakage current stability of the capacitor improved with a higher phosphorous content.

Example 2

Capacitors were formed in the same manner as described in Example 1, except that the starting NbO(N) powder contained 3,000 parts per million of nitrogen. Once formed, various electrical parameters were measured and twenty-five (25) of the capacitors were subjected to life testing. The results are set forth below.

| Nitrogen content [ppm] | Phosphorus content [ppm] | DCL [μA] | Number of DCL rejects after life testing |
|---|---|---|---|
| 3,000 | 0 | 0.101 | 25 rej |
| 3,000 | 100 | 0.045 | 25 rej |
| 3,000 | 200 | 0.120 | 25 rej |
| 3,000 | 500 | 0.001 | 25 rej |
| 3,000 | 1,000 | 0.053 | 25 rej |

Doping of NbO powder with phosphorus shows lower DCL results than in Example 1. It is expected that higher phosphorous concentrations would also lead to improved DCL stability.

Example 3

Capacitors were formed in the same manner as described in Example 1, except that the starting NbO powder contained 5,000 parts per million of nitrogen. Once formed, various electrical parameters were measured and twenty-five (25) of the capacitors were subjected to life testing. The results are set forth below.

| Nitrogen content [ppm] | Phosphorus content [ppm] | DCL [μA] | Number of DCL rejects after life testing |
|---|---|---|---|
| 5,000 | 0 | 0.101 | 25 rej |
| 5,000 | 100 | 0.045 | 25 rej |
| 5,000 | 200 | 0.120 | 25 rej |
| 5,000 | 500 | 0.001 | 25 rej |
| 5,000 | 1,000 | 0.053 | 25 rej |

Example 4

Capacitors were formed in the same manner as described in Example 1, except that the starting NbO powder had a specific charge of 60,000 μF*V/g. Once formed, various electrical parameters were measured and twenty-five (25) of the capacitors were subjected to life testing. The results are set forth below.

| Phosphorus content [ppm] | DCL [μA] | Number of DCL rejects after life testing |
|---|---|---|
| 0 | 0.297 | 23 rej |
| 100 | 0.844 | 25 SC |
| 200 | 0.756 | 25 SC |
| 500 | 0.361 | 25 SC |
| 1,000 | 0.704 | 25 rej |

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. An electrolytic capacitor comprising:
   an anode body that contains a powder formed by blending electrically conductive ceramic particles and dopant particles, wherein the dopant particles contain a non-metallic element having a ground state electron configuration that includes five or more valence electrons at an energy level of three or more, and wherein the non-metallic element constitutes about 100 parts per million or more of the powder;
   a dielectric layer overlying the anode body; and
   an electrolyte layer overlying the dielectric layer.

2. The electrolytic capacitor of claim 1, wherein the dopant particles includes a metal and the non-metallic element.

3. The electrolytic capacitor of claim 1, wherein the dopant particles include a metal phosphide.

4. The electrolytic capacitor of claim 3, wherein the metal phosphide includes niobium phosphide.

5. The electrolytic capacitor of claim 1, wherein the ceramic particles contain an oxide of niobium, tantalum, vanadium, or combinations thereof.

6. The electrolytic capacitor of claim 1, wherein the ceramic particles contain an oxide of niobium having an atomic ratio of niobium to oxygen of about 1:less than 1.5.

7. The electrolytic capacitor of claim 1, wherein the ceramic particles contain an oxide of niobium having an atomic ratio of niobium to oxygen of 1:1.0±0.1.

8. The electrolytic capacitor of claim 1, wherein the electrically conductive ceramic particles have a specific charge of about 80,000 μF*V/g or more.

9. The electrolytic capacitor of claim 1, wherein the non-metallic element includes phosphorous, arsenic, antimony, or a combination thereof.

10. The electrolytic capacitor of claim 9, wherein the non-metallic element includes phosphorous.

11. The electrolytic capacitor of claim 9, wherein the non-metallic element is present in the powder in an amount of about 200 parts per million or more.

12. The electrolytic capacitor of claim 9, wherein the non-metallic element is present in the powder in an amount of about 1,000 to about 5,000 parts per million.

13. The electrolytic capacitor of claim 1, further comprising at least additional layer that overlies the electrolyte layer, the additional layer including a carbon layer, silver layer, or a combination thereof.

14. The electrolytic capacitor of claim 1, further comprising an anode lead that extends from the anode body.

15. The electrolytic capacitor of claim 14, further comprising:
- a cathode termination that is in electrical communication with the electrolyte layer;
- an anode termination that is in electrical communication with the anode body; and
- a case that encapsulates the capacitor and leaves at least a portion of the anode and cathode terminations exposed.

16. The electrolytic capacitor of claim 1, wherein the electrolyte layer contains a conductive polymer.

17. The electrolytic capacitor of claim 1, wherein the electrolyte layer contains manganese dioxide.

18. The electrolytic capacitor of claim 1, wherein the breakdown voltage of the capacitor is at least about 16 volts.

* * * * *